(12) United States Patent
Ziehl et al.

(10) Patent No.: US 11,802,400 B2
(45) Date of Patent: Oct. 31, 2023

(54) METHOD OF USE OF FLANGE CONNECTORS FOR DOUBLE TEE BEAMS

(71) Applicant: UNIVERSITY OF SOUTH CAROLINA, Columbia, SC (US)

(72) Inventors: Paul Ziehl, Irmo, SC (US); Rafal Anay, Columbia, SC (US)

(73) Assignee: University of South Carolina, Columbia, SC (US)

( * ) Notice: Subject to any disclaimer, the term of this patent is extended or adjusted under 35 U.S.C. 154(b) by 135 days.

(21) Appl. No.: 17/373,096

(22) Filed: Jul. 12, 2021

(65) Prior Publication Data

US 2021/0340753 A1 Nov. 4, 2021

Related U.S. Application Data

(62) Division of application No. 15/807,083, filed on Nov. 8, 2017, now abandoned.

(60) Provisional application No. 62/420,100, filed on Nov. 10, 2016.

(51) Int. Cl.
| | |
|---|---|
| *E04B 5/02* | (2006.01) |
| *F16B 1/00* | (2006.01) |
| *E04B 1/21* | (2006.01) |
| *E04B 1/41* | (2006.01) |
| *E04B 1/98* | (2006.01) |

(52) U.S. Cl.
CPC ........... *E04B 1/215* (2013.01); *E04B 1/41* (2013.01); *E04B 5/023* (2013.01); *E04B 1/98* (2013.01); *Y10T 29/49632* (2015.01); *Y10T 29/49874* (2015.01)

(58) Field of Classification Search
CPC . F16B 1/0014; F16B 35/041; Y10T 29/49865
See application file for complete search history.

(56) References Cited

U.S. PATENT DOCUMENTS

| | | |
|---|---|---|
| 823,292 A | 6/1906 | Robinson |
| 3,295,873 A | 1/1967 | Attwood |
| 3,329,451 A | 7/1967 | Aeschliman |
| 3,369,334 A | 2/1968 | Berg |
| 3,456,407 A | 7/1969 | Davidson |
| 3,491,499 A | 1/1970 | Dyer |
| 4,545,701 A | 10/1985 | Tsuzuki |
| 4,569,167 A | 2/1986 | Staples |
| 4,781,006 A | 11/1988 | Haynes |
| 6,065,263 A | 5/2000 | Taguchi |

(Continued)

OTHER PUBLICATIONS

ACI. "ACI 318-14 Building Code Requirements for Structural Concrete and Commentary" *Am. Conc. Inst. Committee* (2014) pp. 1-524.

(Continued)

*Primary Examiner* — Flemming Saether
(74) *Attorney, Agent, or Firm* — DORITY & MANNING, P.A.

(57) ABSTRACT

A connector for joining concrete structures such as double tee beams to one another. The connector includes a curved bolt that is formed with a shape memory alloy. Through utilization of the bolt, a joint can be post-tensioned following assembly through application of heat to the joint. Post-tensioning can be reapplied following loosening of the joint through application of heat. When considering a super elastic shape memory alloy, the bolt can be a smart bolt that can self-correct following deformation due to excessive load.

13 Claims, 3 Drawing Sheets

(56) References Cited

U.S. PATENT DOCUMENTS

| | | |
|---|---|---|
| 6,185,897 B1 | 2/2001 | Johnson et al. |
| 6,401,416 B1 | 6/2002 | Ytterberg |
| 6,688,828 B1 | 2/2004 | Post |
| 7,287,358 B2 | 10/2007 | Zambelli et al. |
| 8,209,933 B2 | 7/2012 | Law |
| 8,713,891 B2 | 5/2014 | Carr et al. |
| 8,800,232 B1 | 8/2014 | Keenan |
| 8,907,050 B2 | 12/2014 | Saleh et al. |
| 9,903,119 B2 | 2/2018 | Tadros et al. |
| 2008/0075557 A1 | 3/2008 | Johnson et al. |
| 2008/0213062 A1 | 9/2008 | Johnson et al. |
| 2008/0307723 A1 | 12/2008 | Smith et al. |
| 2009/0126288 A1 | 5/2009 | Fanucci et al. |
| 2013/0324674 A1 | 12/2013 | Saleh et al. |

OTHER PUBLICATIONS

Amado, et al. "Design and Testing of S-31 Bridge Replacement Project using Rapid Construction Method" *PCI Conv. Nat'l Bridge Conf.* (2013).

Anay, R. "Design of Beam-Column using Artificial Neural Network" *Eng. Techn. J.* (2012).

El Batanouny, et al. "Condition Assessment of Prestressed Concrete Beams using Cyclic and Monotonic Load Tests" *ACI Struct. J.* 111 (2014) pp. 1-10.

Gleich, et al. "PCI Committed Report: Joints in Precast Parking Structures" *PCI J.* (2007) pp. 124-139.

Hogan, et al. "Precast, Prestressed Concrete Tees" *IBEC* (2013).

Isobe, et al. "Characterization of Hydrated Silicate Glass Microballoons" *J. Mater. Res.* 11 (1996) pp. 2908-2015.

JVI. "The JVI Vector Connector User Guidelines" *JVI-Inc.com* 3.2 (2018) pp. 1-11.

Larosche, et al. "Prestressed Pile to Bent Cap Connections: Seismic Performance of a Full-Scale Three-Pile Specimen" *J. Bridge Eng.* 19:04013012 (2014) pp. 1-10.

Martí-Vargas, et al. "Bibliometric Analysis of Web of Science-Indexed Papers on Concrete Segmental Bridges" *PCI J.* (2015) pp. 118-133.

PCI. "Maintenance Manual for Precast Parking Structures" *Precast/Prestressed Conc. Inst.* MNL-136-04 (2004) pp. 1-30.

Pincheira, et al. "Behavior of Double-Tee Flange Connectors Subjected to In-Plane Monotonic and Reversed Cyclic Loads" *PCI J.* (2005) pp. 32-54.

Reis, et al. "Nondestructive Radiographic Evaluation and Repairs to a Prestressed Concrete Parking Structure Following Partial Collapse" *J. Perf. Constr. Facil.* 29:04014157 (2015) pp. 1-8.

Sawaguchi, et al. "Development of Prestressed Concrete Using Fe—Mn—Si-Based Shape Memory Alloys Containing NbC" *Mater. Trans.* 47 (2006) pp. 580-583.

SCIENCEDIRECT®. "Shape Memory Alloy—An Overview" *Elsevier B.V.* (2018) pp. 1-16.

Shrestha, et al. "Feasibility of Cu—Al—Mn Superelastic Alloy Bars as Reinforcement Elements in Concrete Beams" *Smart Mater. Struct.* 22:025025 (2013) pp. 1-12.

Song, et al. "Applications of Shape Memory alloys in Civil Structures" *Eng. Struct.* 28 (2006) pp. 1266-1274.

Yalcin, et al. "Polymer Composites with Hollow Glass Microspheres: Processing, Properties, and Applications" *SPE 70th ANTEC® Conf. Proc.* D26 (2012) pp. 897. (Abstract only).

METHOD OF USE OF FLANGE CONNECTORS FOR DOUBLE TEE BEAMS

CROSS REFERENCE TO RELATED APPLICATION

This application is a divisional application of U.S. patent application Ser. No. 15/807,083, entitled "Flange Connectors for Double Tee Beams," having a filing date of Nov. 8, 2017, which claims filing benefit of U.S. Provisional Patent Application Ser. No. 62/420,100 having a filing date of Nov. 10, 2016, both of which are incorporated herein by reference for all purposes.

BACKGROUND

The load-bearing structure known as the double tee beam includes a flange and two webs (also known as stems) in a unitary construction that creates a structure capable of withstanding high loads while having a long span. The typical size of double tee beams is up to 15 feet (4.6 m) for flange width, up to 5 feet (1.5 m) for web depth, and up to 80 feet (24 m) or more for span length. Double tee beams are widely used by the precast/prestressed concrete industry as they are economical, can be rapidly constructed, and can make use of in-plant quality control to ensure consistency in the material properties, curing procedures, and dimensions of the final product.

In construction of large structures, for instance a floor system, double tee beam flanges are joined with mechanical connectors to resist horizontal shear forces from lateral loads (wind or earthquake), vertical shear from gravity loads and differential camber adjustment, as well as to withstand volume change-induced forces. The quality of joints between the flanges of the double tees is very important as these joints must incorporate adequate diaphragm connections to ensure overall structural stability as well as to provide displacement compatibility over a long service life. Typical flange connectors include hairpin connectors, stud-welded deformed bar anchors, bent wings, mesh and angle connectors, structural tees, bent plate connectors, and vector connectors. Connections are typically made using metal hardware cast into each flange. After erection, the hardware is welded to complementary hardware cast into an adjacent flange to form the joint.

Deficiencies in design, construction, or maintenance of connections can result in premature distress of a joint. Deterioration of joints, longitudinal joints in particular, can affect the service life of structures. Repair methods such as reinstatement of a connection and/or added support to a damaged joint are available; however, these repair methods can be complicated and not necessarily can return the joint to its original strength.

What are needed in the art are connectors for use in joining flanges of double tee beams that can be easily installed, non-corroding, and highly durable. Moreover, connections that can allow for reapplication of post-tensioning following degradation would be of great benefit.

SUMMARY

According to one embodiment, disclosed is a connector for a reinforced concrete slab and, in one particular embodiment, for a double tee beam flange. The connector includes a bolt that is curved between the first end and the second end. The bolt is formed with a shape memory alloy and, in one particular embodiment, a super elastic shape memory alloy.

Also disclosed is a method of forming a joint between two reinforced concrete slabs, e.g., between the flanges of two adjacent double tee beams. A method can include retaining a first portion of the curved bolt formed with a shape memory alloy within a duct of a first concrete slab and retaining a second portion of the curved bolt within a duct of a second concrete slab. The method can include pre-straining the curved bolt prior to inserting the bolt within the ducts and, following retaining the bolt within the ducts, heating the bolt to a temperature that is near or greater than the upper transition temperature of the shape memory alloy to apply post-tensioning to the joint.

Beneficially, the shape memory alloy of the bolt can provide for reapplication of post-tensioning of the bolt following initial formation of a joint. Accordingly, in one embodiment, disclosed is a method for repairing degradation of a joint that includes heating the curved bolt of the joint to a temperature that is at or greater than the upper transition temperature of the shape memory alloy of the bolt to reapply post-tensioning to the joint.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
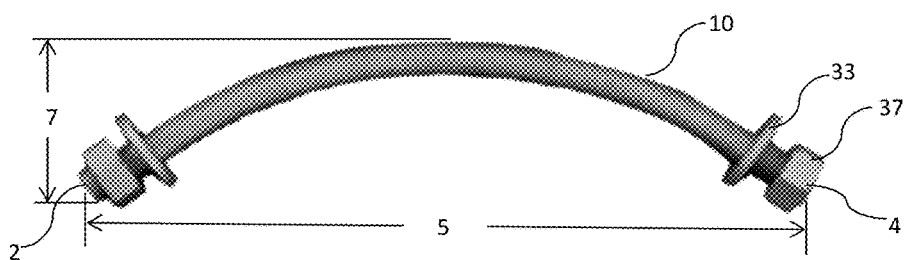
FIG. 1 illustrates one embodiment of a bolt as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to a durable and easily installed connector for joining concrete structures to one another and, in one particular embodiment, for joining double tee beams. The connector can be particularly beneficial for joining double tee beams for parking structure applications, but it should be understood that the connections are in no way intended to be limited to joining double tee beams or to double tee beam joints formed in parking structure applications. In fact, the connectors can be beneficially utilized in forming joints in any reinforced concrete construction project including, without limitation, buildings, bridges, and dams.

The connectors include a curved bolt formed of a non-corroding and highly durable shape memory alloy and, in one particular embodiment, a super elastic shape memory alloy. A shape memory alloy can offer an efficient method to connect adjacent slabs through heating of the bolt following positioning, thereby applying a post-tensioning force across the joint. In the event that degradation does occur, reheating of the bolt can reapply the post-tensioning force. Moreover, when using super elastic shape memory alloy, the bolt can actively resist joint movement under loading and a restoring force can be applied across the joint even in the absence of heat application.

FIG. 1 illustrates one embodiment of a bolt 10 as can be utilized in forming a joint between reinforced concrete slabs. As shown, the bolt 10 is curved between the first end 2 and the second end 4. The curve of the bolt 10 can in one embodiment describe a single radial curvature from the first end 2 to the second end 4 as shown, but this is not a requirement of a bolt, and in other embodiments, a bolt can describe multiple radial curvatures, optionally in conjunction with one or more non-curved segments between the first end and the second end. However, the curvature of the bolt should be such that a portion of the bolt can be fed through a preformed duct within a reinforced concrete slab as further described herein. As shown in FIG. 1, the bolt 10 can be designed with appropriate threading, etc. for use in conjunction with washers 33 and nuts 37.

The bolt 10 can be of any convenient size, with a preferred size generally depending upon the specific application and dimensions of the reinforced concrete slabs that will be joined by use of the bolt. For instance, when considering utilization of a curved bolt 10 for joining flanges of double tee beams, the bolt 10 can have a span 5 of about 2 feet (about 0.6 meters) or more; for instance, from about 4 feet (1.2 meters) to about 6 feet (about 1.8 meters), or more in some embodiments. As utilized herein, and with reference to FIG. 1, the span 5 of a curved bolt is generally intended to refer to the straight length between the center of the first end 2 and the second end 4.

Similarly, the preferred height and cross-sectional dimension of a bolt will generally depend upon the specific application and dimensions of the reinforced concrete slabs that will be joined by use of the bolt. For instance, when considering utilization of a curved bolt 10 for joining flanges of double tee beams, the bolt 10 can have a height 7 of about 2 inches (about 5 centimeters) or greater; for instance, from about 2 inches to about 6 inches (15 centimeters) in some embodiments. The bolt 10 can generally have a regular circular cross-sectional dimension across the length of the bolt, but this is not a requirement, and the bolt can vary in cross-sectional shape and size along the length in other embodiments. In one embodiment, a bolt 10 can have a cross-sectional dimension (e.g., diameter) of about 0.2 inches (about 5 millimeters) or greater; for instance, from about 0.2 inches to about 1 inch (25.4 millimeters) in some embodiments.

The bolt 10 of the connector can be formed of a shape memory alloy. In some embodiments, other components of the connector such as a washer 33 and/or a nut 37 can also be formed of a shape memory alloy. Shape memory alloys can exist in two different phases with three different crystal structures. As such, these materials have the characteristic that they can be deformed from an original shape while at relatively low temperatures, and then when heated to a higher temperature, they will automatically return to their original shape. When a shape memory alloy is in a low-temperature condition (i.e., below its predetermined transition temperature range), it will exist in a first phase. At a higher temperature condition, the alloy will exist in a second phase.

While various shape memory alloys can exist in several different temperature-dependent phases, the most commonly utilized of these phases are the so-called Martensite and Austenite phases. The transition between the two phases is dependent on temperature (and stress in the case of super elastic shape memory alloys), with the transition between the two phases taking place over a transition temperature range that can vary for different materials.

When a structure formed of a shape memory alloy is deformed when in the lower temperature phase, upon subsequent heating to temperature that is well into or above the transition temperature range, a phase transition from the first phase to second phase occurs and the structure will return to the pre-deformed shape. The shape change may be manifest as a change in size, i.e., expanded but similarly shaped, and/or a change in shape, i.e., expanded to a different shape (generally referred to herein as a shape change). In general, the shape memory alloy can have one-way shape characteristics. A one-way shape memory can transition to the desired shape (e.g., a post-tensioning shape) upon heating to a temperature that is near or above the upper end of the transition temperature range and can remain in that operative shape after cooling below the transition temperature range.

The temperature or temperature range at which the shape memory alloy 'remembers' its pre-deformation form when heated can be adjusted by slight changes in the composition of the alloy and through heat treatment. In nickel-titanium shape memory alloys, for instance, this temperature range can be varied from about 100° C. to about −100° C. The shape recovery process can occur over a temperature range of just a few degrees within this range and the start or finish of the transformation can be controlled to within a degree or two depending on the desired application and specific alloy composition.

Suitable shape memory alloy materials include, without limitation, nickel-titanium based alloys (nitinol alloys), indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. Examples of nickel-titanium based alloys include alloys of nickel and titanium; alloys of nickel, titanium, and platinum; alloys of nickel, titanium, and palladium; and alloys of nickel, titanium and at least one other metal. The alloys can be binary, ternary, or any higher order so long as the alloy composition exhibits a shape memory effect, e.g., change in orientation, damping capacity, and the like. In one embodiment, a titanium nickel alloy can be utilized.

Figure 2:
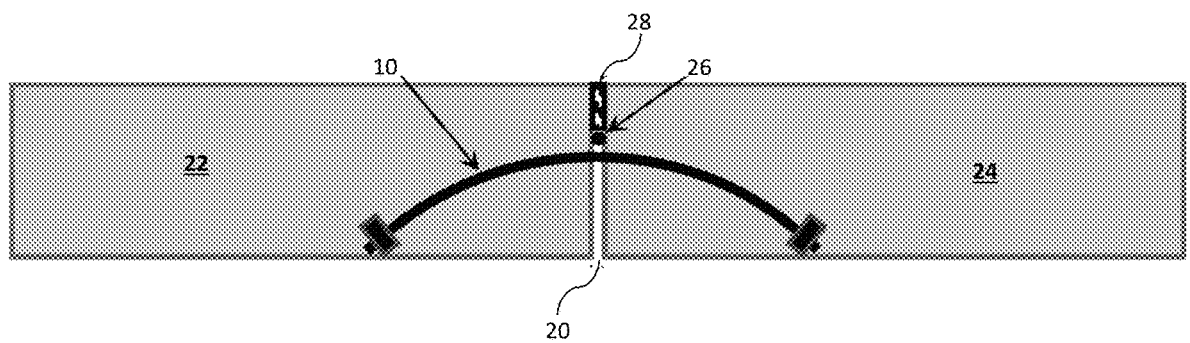
FIG. 2 presents a side view of a joint including a bolt as described herein formed between two adjacent flanges.

FIG. 2 illustrates a joint 20 between two flanges 22, 24 formed by use of a bolt 10. By use of the shape memory alloy material, the bolt 10 can be deformed prior to assembly with the flanges 22, 24. For instance, the bolt 10 can be stretched. To assemble the joint, each end of the deformed bolt 10 can be fed through a duct formed into the respective flanges 22, 24 and retained therein by use of washers, nuts, etc., according to standard practice. Following, the bolt 10 can be heated to a temperature that is near or above the upper temperature of the transition temperature range of the shape memory alloy that forms the bolt 10. For example, the bolt can be heated to a temperature that is about 5° C. less than the upper temperature of the transition temperature range or greater. Upon heating, the shape memory alloy will transition to the high temperature phase (e.g., the Austenite phase) and the bolt 10 will return to the pre-deformation shape. This shape modification can thus apply post-tensioning to the joint 20. A joint can also include backer rod 26 and sealant 28 as shown and as is generally known in the art.

Beneficially, should degradation of the joint 20 occur following initial construction, for instance due to structural settling or some other action causing deformation of the bolt 10 and degradation of the joint 20, the bolt can be heated again to a temperature that is near or above the upper temperature of the transition temperature range. Upon heating, the shape memory alloy will transition to the high temperature phase (e.g., the Austenite phase) and the bolt 10 will return to the pre-deformation shape. Thus, the joint post-tensioning can be reapplied by use of the shape memory alloy of the bolt to fully restore initial joint characteristics without the necessity of conventional repair systems.

In one embodiment, the bolt can include a super elastic shape memory alloy. A super elastic shape memory alloy can reversibly deform to a very high strain (e.g., up to about 10%) through mechanically loading. Upon removal of the load, the phase becomes unstable and the material reverts to the low load phase and regains the original shape. While the material can also exhibit the temperature-induced phase change common to shape memory alloys, the temperature change is not required for the alloy to recover the original pre-deformation shape. In this embodiment, the bolt (and the joint) can demonstrate a self-correcting restoration to desired post-tensioned characteristics.

Application of sufficient stress when a super elastic shape memory alloy is in its Austenitic phase can cause the alloy to change to its lower modulus Martensitic phase in which it can exhibit up to about 8% of super elastic deformation. Removal of the applied stress will cause the alloy to switch back to its Austenitic phase, in so doing recovering its starting shape and higher modulus, and dissipating energy. Beneficially, the bolt formed from the super elastic shape memory alloy can be strained to deformation values several times greater than other connectors formed of ordinary metal alloys without being permanently plastically deformed over a specific temperature range.

Nitinols as discussed above are common super elastic shape memory alloys as may be utilized in forming a bolt. Other super elastic shape alloys can alternatively be used, however, such as, without limitation, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. Some specific examples include alloys of copper-zinc-aluminum-nickel, copper-aluminum-nickel, nickel-titanium, zinc-copper-gold-iron, gold-cadmium, iron-platinum, titanium-niobium, gold-copper-zinc, iron-manganese, zirconium-cobalt, zinc-copper, and titanium-vanadium-palladium.

Figure 3:
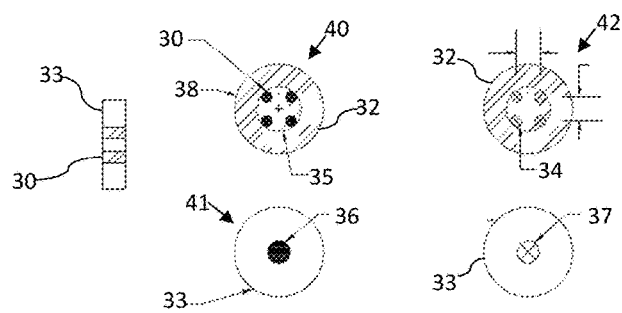
FIG. 3 presents end views and a side view of portions of connectors as described herein FIG. 4 schematically illustrates a joint formed between two adjacent flanges.

In one embodiment, an entire bolt can be formed of a shape memory alloy. In other embodiments, only a portion of a bolt can be formed of the shape memory alloy; for instance, in one embodiment, the bolt can include a plurality of rods held or twisted together that can be joined by use of a shape memory alloy or by a different type of material. For example, FIG. 3 illustrates at 40 a cross-sectional view of one embodiment of a connector that includes four rods 30, each of which can be formed of a shape memory alloy. In another embodiment, the bolt can include a single rod 36 that can form the body of the bolt, as shown at 41 of FIG. 3. Of course, a bolt can include alternative numbers of individual rods of a shape memory alloy.

Also shown in FIG. 3 is a cross-sectional view of a duct 32 that can be cast into the concrete slab (e.g., the double tee beam flange) and through which the body of the bolt can be fed during assembly of the joint. For instance, as shown at 40 of FIG. 3, a plurality of rods 30, each of which can be formed of a shape memory alloy, can be fed through a duct 32. The rods 30 can be fed through the duct 32, either combined together in a single opening as shown at 40 or separately through a series of holes 34 formed in the duct 32 with suitable sizes and center-to-center spacing as shown at 42.

As shown at 40 of FIG. 3, a duct 32 can include an expansion at which point it expands from a first diameter 35 to a second diameter 38 that can accommodate a nut that will retain the bolt within the concrete slab. In general, the connector can also include a washer 33 for use in conjunction with the nut. The washer 33 can be sized to fit at the expansion of the duct 32. The washer 33 can include an aperture 37 sized to hold either a plurality of rods 30 or a single rod 36, according to standard practice.

Figure 4:
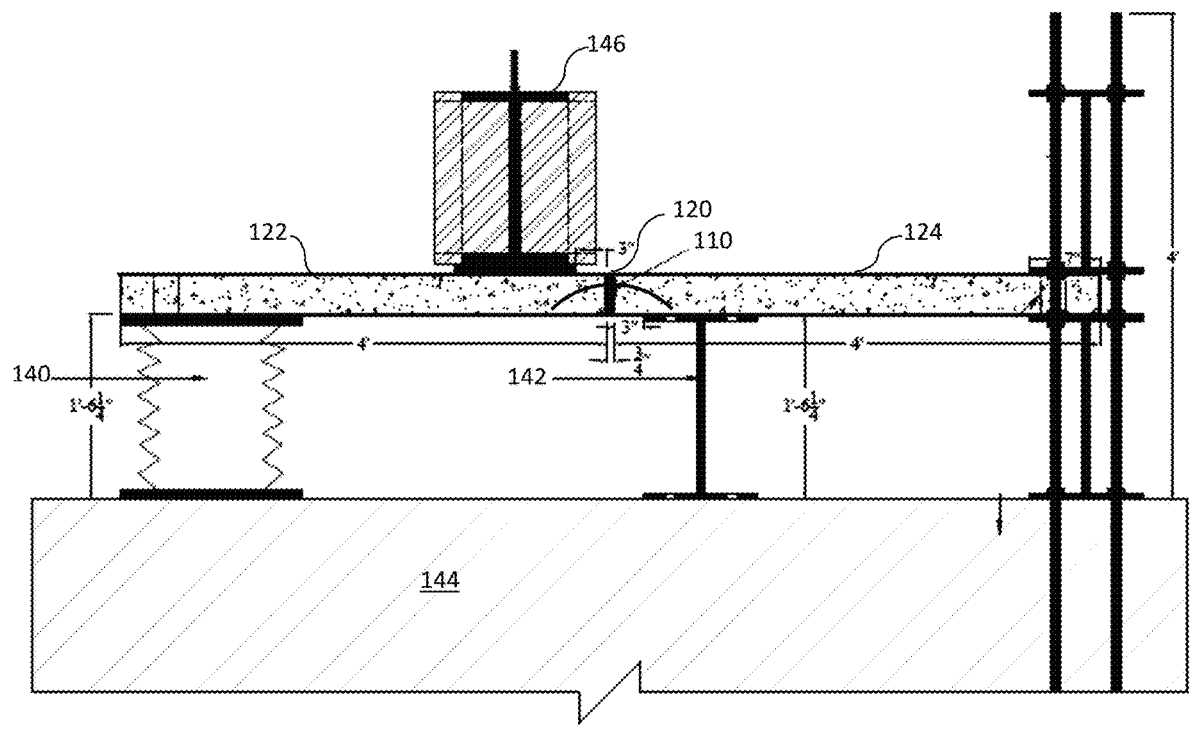

FIG. 4 schematically illustrates one embodiment of use for a connector. Specifically, FIG. 4 illustrates a joint 120 formed between a flange of a first double tee beam 122 and a second double tee beam 124 that incorporates a bolt 110 as described herein. The joined double tee beams 122, 124, can be, for example, a portion of a floor in a building, e.g., a parking garage. The embodiment of FIG. 4 describes a testing protocol that includes spring supports 140, as well as more standard supports 142 to maintain the beams 122, 124 above a test floor 144, and that examines the characteristics of the joint 120 under pressure applied by use of an actuator 146.

Figure 5:
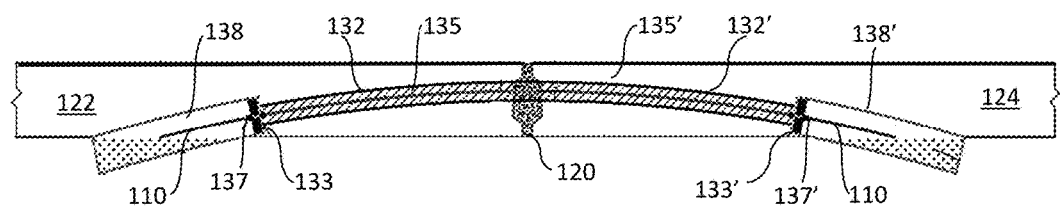
FIG. 5 presents a side view of the connector in the joint of FIG. 4.
Figure 6:
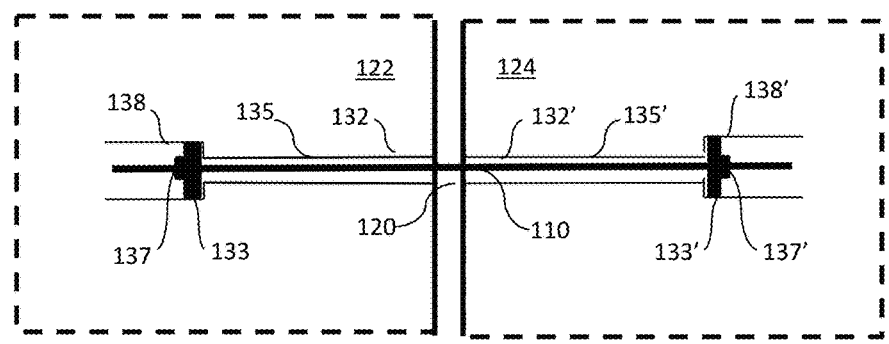
FIG. 6 presents a top view of the connector in the joint of FIG. 4.

FIG. 5 presents an enlarged side view of the joint 120, and FIG. 6 presents an enlarged top view of the joint 120. As can be seen, the connection can include a duct 132 formed in the first double tee beam 122 that expands from a first diameter 135 to a second diameter 138 along the passage of the duct 132. Likewise, the mated double tee beam 124 can include a duct 132' that expands from a first diameter 135' to a second diameter 138' along the passage of the duct 132'. The ducts 132, 132' can be formed of a suitable metal, e.g., stainless steel or the like, and can be cast into the double tee beams 122, 124 at formation.

As shown, the bolt 110 can be fed through the ducts 132, 132' such that a first portion of the bolt 110 passes through the duct 132 and a second portion of the bolt 110 passed through the duct 132'. At the area at which the ducts 132, 132' expand to the larger diameters 138,138', washers 133, 133' and nuts 137, 137' can be affixed to retain the bolt 110 across the joint 120. Any end portion of the ducts 132, 132' and bolt 110 that extend beyond the base of the double tee beams 122, 124 can be cut off such that the connector is flush with the base of the beams.

Prior to assembly, the bolt 110 can be pre-strained, e.g., deformed, for instance, stretched. Following assembly, the bolt can be heated to a temperature that is near or above the upper temperature of the transition temperature range so as to apply pre-tensioning to the joint 120.

Figure 7:
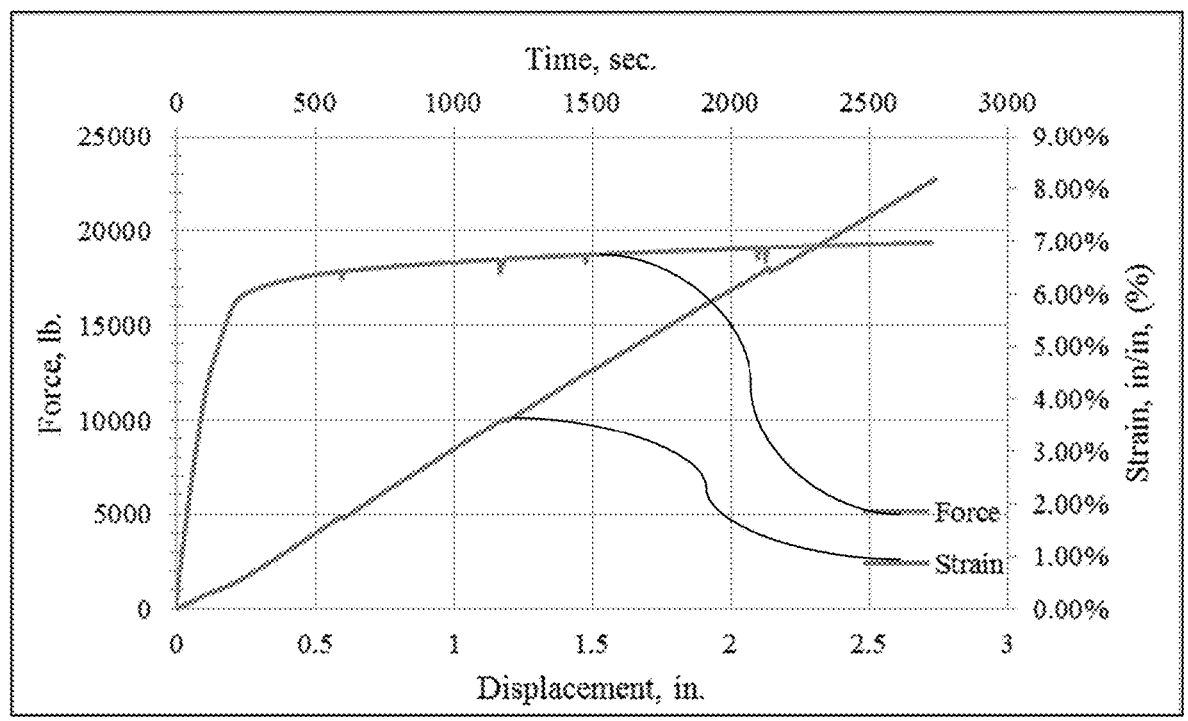
FIG. 7 illustrates pre-straining behavior of shape memory alloy as may be utilized in forming a connector.
Figure 8:
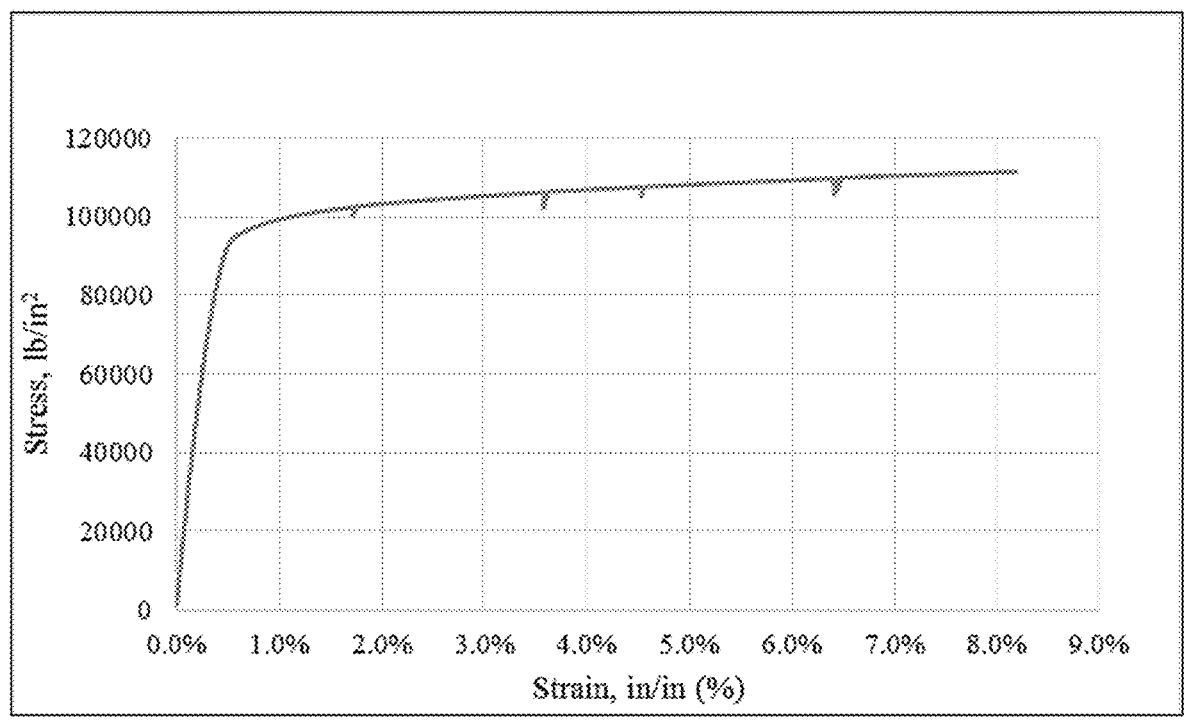
FIG. 8 illustrates a stress vs. strain curve of a shape memory alloy as may be utilized in forming a connector.

Use of connectors that include a bolt with a shape memory alloy can provide excellent characteristics to a joint formed thereby. FIG. 7 illustrates the change in force and strain as a bolt as described herein is deformed to a longer length (displacement) over time. FIG. 8 illustrates the stress vs. strain curve for a shape memory alloy. Following formation of the joint with the pre-deformed bolt, the joint can be heated to increase the temperature of the bolt at which point the bolt can return to the pre-deformation state. As shown, the high displacement capabilities for the pre-deformed bolts can provide excellent pre-stressing to joints formed with the connectors.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a joint between a first reinforced concrete slab and a second reinforced concrete slab, comprising:
   retaining a first portion of a pre-strained bolt within a first duct located within the first concrete slab, the pre-strained bolt comprising a shape memory alloy and defining a curvature between a first end of the bolt and a second end of the bolt, wherein upon retaining the first portion of the pre-strained bolt within the first duct, a first end of the pre-strained bolt is accessible at an opening in a surface of the first concrete slab;
   retaining a second portion of the pre-strained bolt within a second duct located within the second concrete slab, wherein upon retaining the second portion of the pre-strained bolt within the second duct, a second end of the pre-strained bolt is accessible at an opening in a surface of the second concrete slab;
   following, heating the pre-strained bolt to a temperature in a temperature range that is about 5° C. less than the upper temperature of a transition temperature range of the shape memory alloy or greater and thereby applying a post-tensioning force across the joint that is formed between the first concrete slab and the second concrete slab; and
   at a later time following the application of the post-tensioning force, reheating the bolt to a temperature in the temperature range and thereby reapplying the post-tensioning force to the joint.

2. The method of claim 1, wherein at least one of the first concrete slab and the second concrete slab is a double tee beam.

3. The method of claim 2, wherein both the first concrete slab and the second concrete slab are double tee beams, the joint being formed between flanges of the first double tee beam and the second double tee beam.

4. The method of claim 1, wherein the shape memory alloy is a nickel titanium alloy.

5. The method of claim 1, wherein the shape memory alloy is a super elastic shape memory alloy.

6. The method of claim 1, further comprising deforming a bolt from an original shape so as to alter the shape of the original bolt and form the pre-strained bolt prior to retaining the first and second portions within the first and second ducts, respectively.

7. The method of claim 6, wherein the deformation comprises stretching the bolt.

8. The method of claim 1, wherein the post-tensioning force reapplication is carrying out following structural settling of the first and second concrete slabs.

9. The method of claim 1, wherein the bolt comprises multiple rods, each rod comprising the shape memory alloy.

10. The method of claim 1, wherein the first reinforced concrete slab comprises a first surface, a second surface, and a third surface, the first and second surfaces being parallel and spaced apart from one another, the third surface being planar and extending from the first surface to the second surface, the first duct passing from the third surface to the second surface.

11. The method of claim 1, wherein the second reinforced concrete slab comprises a third surface, a fourth surface, and a fifth surface, the third and fourth surfaces being parallel and spaced apart from one another, the fifth surface being planar and extending from the third surface to the fourth surface, the second duct passing from the fifth surface to the fourth surface.

12. The method of claim 1, wherein the first duct and the second duct each include an expansion from a first diameter to a second diameter, the pre-strained bolt being retained by use of a first nut within the first expansion and a second nut within the second expansion.

13. The method of claim 1, wherein upon the step of heating the bolt, the shape memory alloy transitions between a Martensite phase and an Austenite phase.

* * * * *